UNITED STATES PATENT OFFICE

2,371,098
SOFTENING OF RUBBERLIKE SUBSTANCES

Arnold R. Davis, Riverside, Conn., assignor to American Cyanamid Company, New York, N. Y., a corporation of Maine No Drawing. Application October 30, 1943, Serial No. 508,375

15 Claims. (Cl. 260—36)

This invention relates to the softening of synthetic rubber-like masses and is more particularly concerned with copolymers of 1,3-butadiene and acrylonitrile and to the softened products.

This application is a continuation-in-part of my application Serial No. 412,679, filed September 27, 1941.

Synthetic rubber-like masses of the type with which the present invention is especially concerned are exemplified by those sold under the trade names of Perbunan and Hycar O. R. which are essentially copolymers of 1,3-butadiene and acrylonitrile. These synthetic rubbers may be vulcanized with sulfur in somewhat the same manner as can natural rubber, but unlike the latter, are much more difficult to process or work mechanically, being tough and hard to work even after prolonged milling.

It is an object of this invention, therefore, to provide a process for softening synthetic rubber-like masses containing rubber-like copolymerization products of 1,3-butadiene and acrylonitrile, so that they are more easily processed or worked mechanically, e. g., milled, calendered, extruded, etc.

According to my invention this and other objects may be accomplished by mixing with the rubber-like masses a mixed ester of 3,6-endomethylene-Δ-4,5-tetrahydrophthalic acid consisting essentially of a compound of the general formula:

$$R[XY]_n$$

wherein R is a residue of a member of the group consisting of alkylene glycols containing from 2-4 carbon atoms, polyalkylene glycols containing from 4-8 carbon atoms and glycerol, X is the residue of 3,6-endomethylene-Δ-4,5-tetrahydrophthalic acid, Y is an alkyl group containing not more than 8 carbon atoms and $n$ represents the integers 2 and 3.

For brevity and ease of expression, the 3,6-endomethylene - Δ - 4,5 - tetrahydrophthalic acid will hereinafter be referred to as "the tetrahydrophthalic acid," the context permitting.

In the above formula R may be the residue of ethylene, propylene or butylene glycol or of diethylene, dipropylene or dibutylene glycol or of trimethylene, tetramethylene or triethylene glycol. Where R is the residue of any of these dihydric alcohols, X represents the residue of each of two molecules of the tetrahydrophthalic acid, one carboxyl group of each molecule of the tetrahydrophthalic acid being esterified with one hydroxy group of the glycol or polyalkylene glycol.

Where R is the radical of the trihydric alcohol, glycerol, X represents the residue of each of three molecules of the tetrahydrophthalic acid, one carboxyl group of each molecule of the tetrahydrophthalic acid being esterified with one hydroxyl group of the glycerol.

The alkyl group Y, on the remaining carboxyl group of each molecule of the tetrahydrophthalic acid, in either of the foregoing instances, may be the branched or unbranched hydrocarbon residue of a primary, secondary or tertiary aliphatic alcohol, providing the number of the carbon atoms thereof is that noted above. For example, the alkyl group may be methyl, ethyl, propyl,  butyl, amyl or hexyl or the branched chain alkyl group of an 8 carbon atom secondary alcohol, such as 2-ethyl hexyl alcohol. Like or dissimilar alkyl groups of the class described may be attached to these carboxyl groups of the tetrahydrophthalic acid molecules. Preferably the alkyl groups have 4 to 5 carbon atoms, a preferred alkyl group being n-butyl.

Illustrative of compounds coming within the above general formula are the dibutyl esters of ethylene and butylene glycol bis(3,6-endomethylene-Δ-4,5-tetrahydrophthalic acid), the dibutyl esters of diethylene and dibutylene glycol bis(3,6-endomethylene - Δ - 4,5-tetrahydrophthalic acid) and the tributyl ester of glycerol tris (3,6-endomethylene-Δ-4,5-tetrahydrophthalic acid).

The mixed ester plasticizers are relatively high boiling point liquids and may be prepared as follows:

Example 1

The dibutyl ester of ethylene glycol bis(3,6-endomethylene-Δ-4,5 - tetrahydrophthalic acid) may be prepared by heating a mixture of 5 mols 3,6-endomethylene-Δ-4,5-tetrahydrophthalic acid anhydride with 2.5 mols ethylene glycol at a temperature of about 135° C. for about 15 minutes. About eight mols butyl alcohol is then added, preferably with a small amount of sulfuric acid as an esterification catalyst, and heating is continued for about two or three hours additional. The resulting mixed ester may be purified by distilling off excess alcohol under vacuum and then washing with dilute alkali and water to remove sulfuric acid. If desired, the product may be treated with decolorizing carbon and dilute potassium permanganate. The resultant product is a brownish liquid.

Similarly, other mixed esters may be prepared by substituting other alcohols for the butyl alcohol set forth in Example 1. Likewise, any of the other glycols mentioned or glycerol may be substituted for the ethylene glycol of Example 1. Other esterification catalysts may be used in place of the sulfuric acid.

In the practice of the invention a tetrahydrophthalic acid ester of the class defined above is mixed with the synthetic rubber-like mass during the milling or breaking-down period, e. g., on the mill rolls. The amount of the tetrahydrophthalic acid ester softening agent employed may be varied and in general will be governed by the particular softening agent selected, the degree of toughness of the synthetic rubber-like mass and the extent to which softening of the latter is desired. In general, the amount may be from about 5% or less to about 50% based on the weight of the synthetic rubber-like mass.

The invention is illustrated by the following specific examples to which, however, it is not intended that the invention be limited, parts being by weight.

A 300 gram sample of Hycar O. R. synthetic rubber was milled for one minute. With continued milling there was added slowly thereto 15 grams of the liquid ester, dibutyl ester of ethylene glycol bis(3.6-endomethylene-$\Delta$-4,5-tetrahydrophthalic acid). The mill rolls were maintained at about 50° C. throughout a total milling period of 10 minutes. A control of 300 grams of the copolymer was milled under similar conditions of temperature and for the same period of time.

The milled samples were then tested in a Williams plastometer for effectiveness of the tetrahydrophthalic acid ester as a plasticizer for the copolymer rubber. A 3-minute $y$ value in inches at 100° C. was employed for the tests. The decrease in $y$ value for the sample containing the tetrahydrophthalic acid ester indicates softening of the copolymer therewith. The control had a $y$ value of .184 inch and the sample containing the ester plasticizing agent a $y$ value of .166 inch, showing the ester to have a decided softening action on the synthetic rubber.

*Example 3*

A quantity of Hycar O. R. copolymer synthetic rubber is plasticized with 20% (on the weight of the copolymer) of the same softening agent and in the same manner as described in Example 2. The milled sample had a $y$ value of .144 inch. If compared with the $y$ value of .184 inch for the control, it is evident that the ester softened the synthetic rubber to a considerable degree.

Other samples of the milled product containing the softening agent were compounded with vulcanizing agents and vulcanized in the conventional manner, by curing at 134.5° C. for varying periods of time. These samples gave the following Shore hardness results:

| | |
|---|---|
| 30 min | 62 |
| 45 min | 65 |
| 60 min | 66 |

The vulcanized samples had improved resistance to solubility in gasoline and were superior in this respect to similar samples made utilizing dibutyl phthalate as the softening agent.

In general, synthetic rubber-like materials obtainable by copolymerizing conjugated diene hydrocarbons such as 1,3-butadiene, 1,3- and 1,4-pentadiene, isoprene, or chloroprene, with polymerizable substances such of acrylonitrile, styrene, isobutylene, cyano-butadienes such as 1 and 2 cyanobutadiene, esters of acrylic acid such as methyl acrylate and ethyl acrylate and esters of substituted acrylic acids such as methyl methacrylate, ethyl methacrylate, butyl methacrylate, isoamyl methacrylate, etc., may be softened by milling with one of the tetrahydrophthalic acid ester softening agents. Thus, the synthetic rubber-like masses which may be softened with one of these esters may be those resulting from the polymerization of 1,3-butadiene with acrylonitrile where these materials constitute the sole polymerizable reactants or they may be those from the polymerization of the same with other polymerizable materials of the kind described herein.

Mixtures of a natural rubber with one or more synthetic rubber-like masses of the kind described above also may be obtained in a softened condition with one of the tetrahydrophthalic acid ester softening agents. Also, natural rubbers themselves may be plasticized by milling with a relatively small amount of one of the esters, e. g., about 1-10% on the weight of the rubber.

Where mechanical mixtures of the synthetic rubber-like copolymers of the kind described above either with each other or with a natural rubber are desired in a softened condition, such mixtures are preferably to be obtained by first milling the tougher of the materials with one of the ester softening agents so as to bring the same to a condition of softness approximating that of the softer component, e. g., natural rubber, followed by working in of the latter. If desired, the combined rubber materials may be milled with additional amounts of the ester softening agent.

While I have more particularly described my invention with respect to the application of the tetrahydrophthalic acid esters to the synthetic rubber-like copolymers in the dry condition, they may also be applied to the copolymers in the wet condition. The ester may be mixed with the initial reactants before the polymerization reaction or, as is preferable in order to avoid the possibility of poisoning or inhibiting the polymerization reaction by the presence of the ester, the softening agent in emulsified form may be mixed with the latex from the polymerization before coagulation. In the latter case, the softening agent is preferably emulsified with the same type of emulsifier or dispersing agent, i. e., acidic or basic, as was employed for obtaining the latex emulsion. In either instance, the ester-containing copolymer after coagulation and drying may be milled to develop varying degrees of softness therein.

The softened synthetic rubber-like copolymers or mixtures thereof with each other or with natural rubber may be compounded and vulcanized similarly as can natural rubber, as will be understood by those skilled in the art.

Since suitable modifications and changes may be made in the invention without departing from the spirit and scope thereof, the foregoing description is intended by way of illustration except as may be defined in the following claims.

I claim:

1. A rubber-like plastic mass comprising a rubber-like product of the polymerization of 1,3-butadiene with a polymerizable material comprising acrylonitrile mixed with a mixed ester of the general formula $$R[XY]_n$$

wherein R is the residue of a polyhydric alcohol selected from the group consisting of alkylene glycols containing from 2-4 carbon atoms, polyalkylene glycols containing from 4-8 carbon atoms and glycerol, X is the residue of 3,6-endomethylene-$\Delta$-4,5-tetrahydrophthalic acid, Y is an alkyl group containing not more than 8 carbon atoms, and $n$ is an integer equal to the number of hydroxyl groups in the polyhydric alcohol of which R is the residue.

2. A rubber-like plastic mass comprising a rubber-like polymerization product of 1,3-butadiene and acrylonitrile mixed with a mixed ester of the general formula $$R[XY]_n$$

wherein R is the residue of a polyhydric alcohol selected from the group consisting of alkylene glycols containing from 2-4 carbon atoms, polyalkylene glycols containing from 4-8 carbon atoms and glycerol, X is the residue of 3,6-endomethylene-Δ-4,5-tetrahydrophthalic acid, Y is an alkyl group containing not more than 8 carbon atoms, and $n$ is an integer equal to the number of hydroxyl groups in the polyhydric alcohol of which R is the residue.

3. A rubber-like plastic mass comprising a rubber-like polymerization product of 1,3-butadiene and acrylonitrile mixed with dibutyl ethylene glycol bis(3,6 - endomethylene-Δ-4,5-tetrahydrophthalate).

4. A rubber-like plastic mass comprising a rubber-like polymerization product of 1,3-butadiene and acrylonitrile mixed with dibutyl diethylene glycol bis(3,6 - endomethylene-Δ-4,5-tetrahydrophthalate).

5. A rubber-like plastic mass comprising a rubber-like polymerization product of 1,3-butadiene and acrylonitrile mixed with tributyl glycerol tris(3,6 - endomethylene-Δ-4,5-tetrahydrophthalate).

6. A vulcanizate obtained from a vulcanizable mix comprising a rubber-like plastic mass as set forth in claim 1.

7. A vulcanizate obtained from a vulcanizable mix comprising a rubber-like plastic mass as set forth in claim 2.

8. A vulcanizate obtained from a vulcanizable mix comprising a rubber-like plastic mass as set forth in claim 3.

9. A vulcanizate obtained from a vulcanizable mix comprising a rubber-like plastic mass as set forth in claim 4.

10. A vulcanizate obtained from a vulcanizable mix comprising a rubber-like plastic mass as set forth in claim 5.

11. A process of softening a rubber-like product of the polymerization of 1,3-butadiene with a polymerizable material comprising acrylonitrile which comprises mixing therewith a mixed ester of the general formula $$R[XY]_n$$

in which R is the residue of a polyhydric alcohol selected from the group consisting of alkylene glycols containing from 2-4 carbon atoms, polyalkylene glycols containing from 4-8 carbon atoms and glycerol, X is the residue of 3,6-endomethylene-Δ-4,5-tetrahydrophthalic acid, Y is an alkyl group containing not more than 8 carbon atoms and $n$ is an integer equal to the number of hydroxyl groups in the polyhydric alcohol of which R is the residue.

12. A process of softening a rubber-like polymerization product of 1,3-butadiene and acrylonitrile which comprises mixing therewith a mixed ester of the general formula $$R[XY]_n$$

in which R is the residue of a polyhydric alcohol selected from the group consisting of alkylene glycols containing from 2-4 carbon atoms, polyalkylene glycols containing from 4-8 carbon atoms and glycerol, X is the residue of 3,6-endomethylene-Δ-4,5-tetrahydrophthalic acid, Y is an alkyl group containing not more than 8 carbon atoms and $n$ is an integer equal to the number of hydroxyl groups in the polyhydric alcohol of which R is the residue.

13. A process of softening a rubber-like polymerization product of 1,3-butadiene and acrylonitrile which comprises mixing therewith dibutyl ethylene glycol bis(3,6-endomethylene-Δ-4,5-tetrahydrophthalate).

14. A process of softening a rubber-like polymerization product of 1,3-butadiene and acrylonitrile which comprises mixing therewith dibutyl diethylene glycol bis(3,6-endomethylene-Δ-4,5-tetrahydrophthalate).

15. A process of softening a rubber-like polymerization product of 1,3-butadiene and acrylonitrile which comprises mixing therewith tributyl glycerol tris(3,6 - endomethylene-Δ-4,5-tetrahydrophthalate).

ARNOLD R. DAVIS.

CERTIFICATE OF CORRECTION.

Patent No. 2,371,098.                                              March 6, 1945.

ARNOLD R. DAVIS.

It is hereby certified that error appears in the printed specification of the above numbered patent requiring correction as follows: Page 2, first column, line 21, after the word and period "weight." and before "A 300 gram" in line 22, insert the heading --Example 2--; line 70-71, Example 3, for "1.4-pentadiene" read --1,4-pentadiene--; page 2, first column, line 72, for "such of" read --such as--; and that the said Letters Patent should be read with this correction therein that the same may conform to the record of the case in the Patent Office.

Signed and sealed this 26th day of June, A. D. 1945.

Leslie Frazer (Seal)                         Acting Commissioner of Patents.